T. W. HICKS.
METHOD OF PREPARING SEED BEDS.
APPLICATION FILED AUG. 21, 1916.
1,239,599.
Patented Sept. 11, 1917.
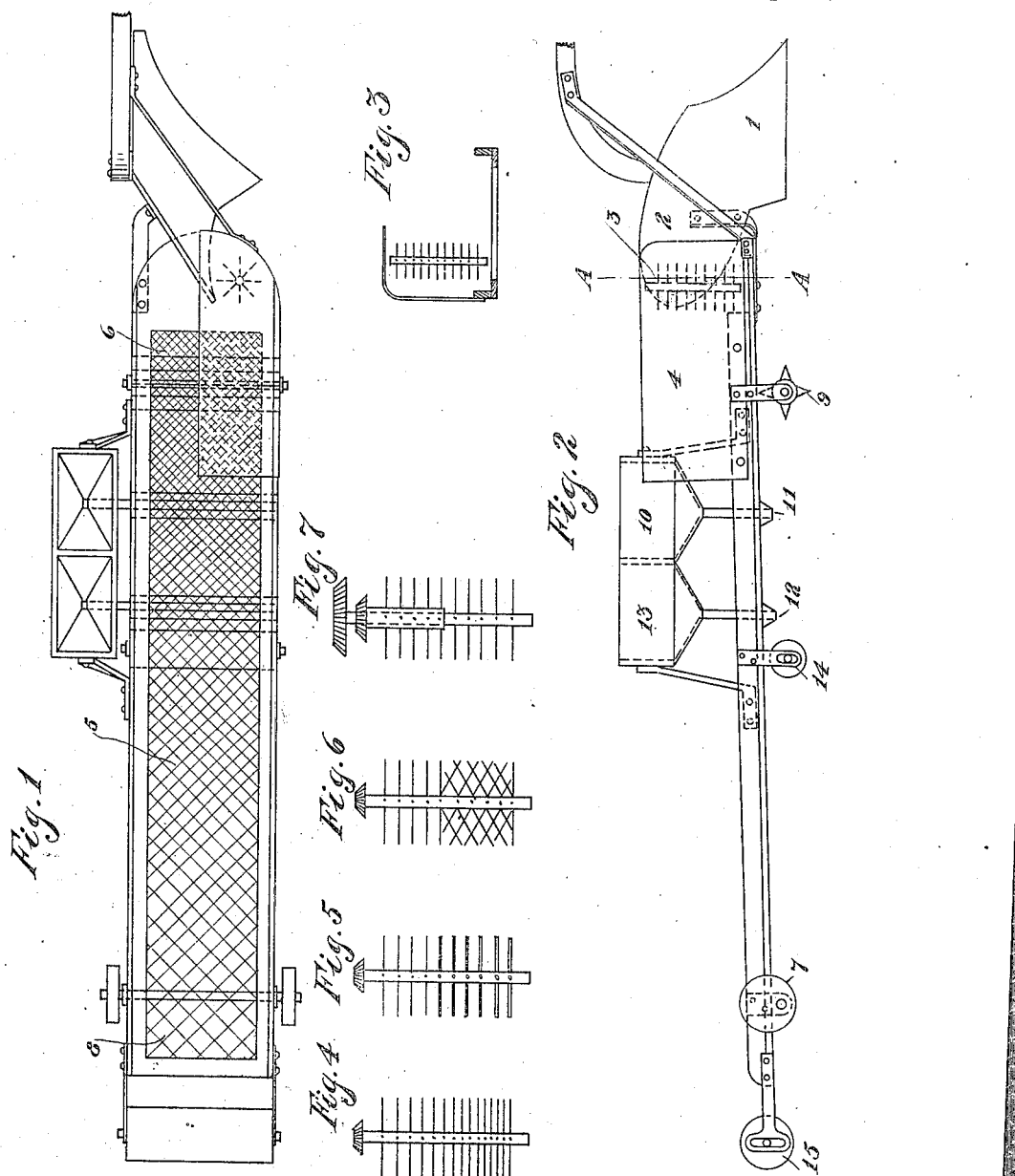
Inventor:
Thomas W. Hicks.
by C. T. Enochs
Attorney.

UNITED STATES PATENT OFFICE.

THOMAS W. HICKS, OF MINNEAPOLIS, MINNESOTA, ASSIGNOR TO SCIENTIFIC FARMING MACHINERY COMPANY, OF MINNEAPOLIS, MINNESOTA, A COMMON LAW COMPANY.

METHOD OF PREPARING SEED-BEDS.

1,239,599.

Specification of Letters Patent.   Patented Sept. 11, 1917.

Application filed August 21, 1916.   Serial No. 116,147.

*To all whom it may concern:*

Be it known that I, THOMAS W. HICKS, a citizen of the United States, residing at Minneapolis, in the county of Hennepin and State of Minnesota, have invented certain new and useful Improvements in Methods of Preparing Seed-Beds, of which the following is a specification.

This invention relates to a method of preparing ground to receive seed.

For an ideal condition of soil to receive seed, the soil should be worked in some manner so as to be in a finely pulverized condition, and in most crops the granules of the pulverized soil should be smaller at the bottom, or root section, of the seed bed and increase in size to the top, or surface section. The sub-soil, or under surface from which the soil was removed before it was worked into its finely pulverized condition and upon which it is again deposited, should also be punctured or scored so as to give a more intimate relation between the root section and the sub-soil, increase the surface of contact between the pulverized soil and the sub-soil and allow moisture to pass more readily through the surface of contact.

The seed should be deposited in the prepared bed at a uniform depth whether it is sown broadcast or in the manner in which it is at the present time planted by drills.

Fertilizer should be applied to the soil, either distributed uniformly through the soil or deposited in a layer, or layers, a certain depth above or below the seed or a combination of these methods the root section should be packed and the remainder of the soil then deposited on the packed root section.

I have conceived a new method of preparing soil to meet these ideal conditions, the method consisting of a certain sequence of operations which may be departed from, more or less, within the limit of this invention.

In my co-pending application of even date for improvements in tillers, I have described and claimed certain mechanism that will perform the functions described in this application, but this application has to do only with the method of preparing the seed bed and does not contemplate any particular type of machine or machines.

To illustrate the method to be hereinafter claimed, reference is had to the drawing which accompanies and forms a part of this specification in which Figure 1 is a plan view of one type of tiller described and claimed in my co-pending application hereinbefore cited. Fig. 2 is a side elevation of the same. Fig. 3 is a section taken on the line AA, Fig. 2, and Figs. 4, 5, 6, and 7 are views of various types of rotors used in varying soil conditions.

The tiller may be drawn by any suitable source of power, and the plow share 1 lifts a certain depth of soil and with the mold board 2 turns this soil onto the rotor 3 which is driven at a comparatively high velocity.

The soil is pulverized by the rotor and guided by the shield 4, is deposited on the screen 5 at the forward end 6.

The rear end of the screen 5 is supported by an eccentrically mounted wheel 7 so as to agitate the screen, and the soil deposited on the end 6 is thus worked backwardly toward the end 8.

The result is the soil lifted by the plow share is broken into granules, the smaller sizes of granules falling from the forward end of the screen and the larger sizes from the back end of the screen so the small size granules will be covered by the large sized granules as the machine is drawn forwardly.

A pronged roller 9 serves to puncture the subsoil before the pulverized dirt falls back thereon, a hopper 10 deposits seed therein, either in rows as a drill would do, or broadcast, a certain amount of soil is deposited between the feeding mechanism 11 of the hopper 10 and the feeding mechanism 12 of the hopper 13 which is adapted to deposit suitable fertilizer on the soil deposited over the planted seed.

A weighted roller 14 packs the root section and the remainder of the pulverized soil drops through the coarser meshes of the screen and the completed seed bed is packed by the weighted roller 15.

The different types of rotors shown in Figs. 4 to 7, inclusive, are utilized in soils of various conditions and tend to, in themselves, distribute soil in different sizes of granules so that this method can actually be worked without the use of the screen 5.

By increasing the number of hoppers and changing their position, I am able to place the seed either sown broadcast or drilled at any desired depth and arrange the layers of fertilizer in any desired relation with the planted seed.

While I have described my invention and illustrated it in one particular form, I do not wish to be understood as confining myself to this particular construction, as it is evident that my invention may be embodied in various ways and different constructions within the scope of the following claims:

1. The method for preparing seed beds, comprising the lifting of a portion of the soil, puncturing or scoring the subsoil, and returning the soil lifted onto the punctured subsoil in a pulverized condition.

2. The method of preparing seed beds, comprising the lifting and pulverizing of a portion of the soil, puncturing or scoring the sub-soil and returning the pulverized soil onto the punctured subsoil with the smaller granules on the subsoil and the size of granules increasing toward the top of the seed bed.

3. The method of preparing seed beds comprising the lifting and pulverizing of a portion of the soil and returning the pulverized sub-soil to the seed bed with a strata of small size granules next to the subsoil, and strata of larger size granules placed thereover.

4. The method of preparing seed beds comprising the lifting of a portion of the soil, receiving it from the lifting means and returning the soil to the earth in a pulverized condition with smaller granules at the bottom of the completed seed bed and larger granules at the top of the completed seed bed.

THOMAS W. HICKS.